United States Patent [19]

Sashou et al.

[11] Patent Number: 4,858,027

[45] Date of Patent: Aug. 15, 1989

[54] VIDEO TAPE RECORDER EDIT CONTROL SYSTEM FOR PERFORMING COLOR FRAME EDITING

[75] Inventors: Hidehiko Sashou; Soujiro Kizu, both of Kanagawa, Japan

[73] Assignee: Sony Corporation, Tokyo, Japan

[21] Appl. No.: 36,261

[22] Filed: Apr. 9, 1987

[30] Foreign Application Priority Data

Apr. 12, 1986 [JP] Japan .............................. 61-084801

[51] Int. Cl.⁴ .............................................. H04N 9/79
[52] U.S. Cl. .................................. 358/311; 360/14.1; 360/14.3; 360/26
[58] Field of Search ............... 358/310, 311, 320, 323, 358/335, 337; 360/14.1–14.3, 10.3, 26, 35.1, 39, 51, 52, 74.1, 74.4

[56] References Cited

U.S. PATENT DOCUMENTS

| | | | |
|---|---|---|---|
| 3,553,355 | 1/1971 | Forster | 358/311 X |
| 3,890,638 | 6/1975 | Bargen | 358/311 X |
| 4,052,733 | 10/1977 | Derenbecher, Jr. | 358/311 X |
| 4,261,020 | 4/1981 | Beeson et al. | 360/14.1 X |
| 4,394,694 | 7/1983 | Ninomiya et al. | 360/14.3 |
| 4,428,001 | 1/1984 | Yamamura et al. | 360/74.1 X |
| 4,507,691 | 3/1985 | Ishiguro et al. | 360/14.3 |
| 4,578,718 | 3/1986 | Parker et al. | 360/10.3 |
| 4,587,574 | 5/1986 | Tsurubachi et al. | 360/14.3 |
| 4,638,390 | 1/1987 | Kozuki et al. | 360/14.1 X |
| 4,663,679 | 5/1987 | Sekiguchi et al. | 360/14.3 X |
| 4,691,250 | 9/1987 | Ookawa | 360/14.1 |
| 4,694,357 | 9/1987 | Rahman et al. | 360/35.1 X |

FOREIGN PATENT DOCUMENTS

| | | | |
|---|---|---|---|
| 52-36920 | 3/1977 | Japan | 358/311 |
| 54-14118 | 2/1979 | Japan | 358/311 |
| 8504066 | 9/1985 | PCT Int'l Appl. | 358/311 |
| 1300402 | 12/1972 | United Kingdom | 358/311 |

Primary Examiner—Aristotelis M. Psitos
Assistant Examiner—W. R. Young
Attorney, Agent, or Firm—Philip M. Shaw, Jr.

[57] ABSTRACT

An electronic editing system utilizes time code signals for deriving the color frame phases of video signals reproduced by a video tape player and by a video tape recorder. A relationship between color subcarrier phases and frame data of the time code signal is derived during a test mode operation and then, in the editing operation, the color subcarrier phases of the video signals of the video tape player and the video tape recorder are derived using this relationship on the basis of the time code signals at editing points. The phase of each color subcarrier is identified by locking color framing pulses of the video signal to a reference synchronizing signal, from which a reference color frame phase can be derived, the difference in phase between the time code signal and the color framing pulse is detected, and the difference in phase between the color framing pulse and the color frame phase of the video signal on the video tape is detected. The so derived color subcarrier phases of the playback and recording tapes are compared at the editing point on each tape and the editing point on one of the two tapes is then shifted until the color subcarrier phases of the playback and recording tapes at the respective editing points match each other.

16 Claims, 3 Drawing Sheets

VIDEO TAPE RECORDER EDIT CONTROL SYSTEM FOR PERFORMING COLOR FRAME EDITING

BACKGROUND OF THE INVENTION

1. Field of the Invention

The present invention relates generally to an electronic editing apparatus. More specifically, the invention relates to an apparatus for performing color frame editing.

2. Description of the Prior Art

In general, in editing a video tape, a desired portion of an original video tape is reproduced onto a master tape at a desired portion thereof. A time code signal is generally recorded on a video tape in the longitudinal direction thereof for indicating and detecting the tape position (tape time). Thus, the time code data for the editing start point, that is, the in-point of the original tape, and the time code data for the editing start point of the master tape are stored in the memory of an editing apparatus.

Therefore, before starting the actual editing operation, an in-point is determined for use in each of VTRs and then each tape is positioned at a pre-roll point in each of the VTRs. The pre-roll point is a tape position located ahead of the in-point by, for example, 5 seconds of tape running time. Thus, during the editing operation, the tape begins running from the pre-roll point in each of the VTRs.

When the two VTRs bearing the original and master tapes are started, time codes are read from the respective tapes of the VTRs. The difference between each of the read-out time codes and the time code at each of the respective determined in-points is calculated, and the running of the original tape, that is, the phase thereof, is controlled so that the values of the above differences are the same. When the differences are both zero, the VTR for the master tape is operated in its recording mode to record a desired video signal reproduced from the original tape.

In other words, during the time period in which the pre-roll portion of each tape is running past the heads of the VTRs, a control operation is carried out so that the values of the time codes for the respective registered in-points are made equal. Since a time-code is provided corresponding to every frame of a picture, the time intervals, within which the respective tapes arrive at their in-points are made equal and frame synchronization is established by controlling the movements of the two tapes. Therefore, synchronizing signals are continuous from the video signal previously recorded on the master tape and the video signal newly recorded from the original tape so that the editing operation can be performed with no picture disturbance.

If a color video signal is recorded subsequent to a prerecorded color video signal, it is necessary that the subcarrier of the color video signal is also continuous from the previously recorded color video signal to the newly recorded color video signal in order to assure that the displayed picture has the correct hue. The process for keeping the continuity of the subcarrier at the editing point is called color frame editing.

As is well known, the phase of the color subcarrier signals of a color television signal in an NTSC system shifts through 4 fields in one cycle. On the other hand, in the PAL system, the phase of the subcarrier signals of the color television signal shift through 8 fields in one cycle. In order to indicate each of the phase shift cycles of the color subcarrier signals of the color television signal, a recurring index signal is superimposed on a control signal (CTL signal) and is recurrent for a given number of fields, e.g. every four (4) fields in the NTSC system, eight (8) fields in the PAL system. The index signal will be hereafter referred to as a "color framing pulse or a color frame pulse". Based on the color framing pulse, the subcarrier phase in each field, which will be hereafter referred to as the "color frame phase" in the color subcarrier phase shifting cycle which will be referred to as the "color frame cycle" can be derived.

In the conventional color frame editing operation utilizing the CTL signal superimposed on the color frame pulses, the time code signal and the color framing pulses reproduced from the playback video tape recorder and the recording video tape recorder are supplied to an edit control apparatus in order to detect a synchronous condition of the video tape recorders. As is well known, a plurality of types of information are supplied to the edit control apparatus in addition to the time code signals and the color framing pulses. Therefore, in order to synchronize the playback video tape recorder and the recording video tape recorder, cables, connectors and so forth for transferring the color framing pulses are required. In addition, in order to detect the color framing pulses, an additional electronic circuit is required in the edit control apparatus. This makes the editing control apparatus bulky and complicated in construction.

SUMMARY OF THE INVENTION

Therefore, it is an object of the present invention is to provide an electronic editing system for video tape recorders, which is satisfactorily compact and of simple construction.

Another and more specific object of the invention is to provide an electronic editing system which does not require cables, connectors and circuits specifically adapted for transferring and detecting color framing pulses.

In order to accomplish the aforementioned and other objects of the invention, an electronic editing system according to the invention utilizes time code signals for detecting the color frame phase of video signals reproduced by a video tape recorder operating in a playback mode, i.e. as a video tape player, and by a video tape recorder operating in the recording mode. In order to enable this, color subcarrier phases are identified by frame data in the time code signal during test mode operation. In the editing operation, the color subcarrier phases of the video signals of the playback video tape recorder and the recording video tape recorders are derived on the basis of the time code signals at the editing points.

In practical operation, the phase of each subcarrier is identified by locking color framing pulses of the video signal to a reference synchronizing signal, from which a reference color frame phase can be derived; detecting the difference in phase between the time code signal and the color framing pulse; and, finally, detecting difference in phase between the color framing pulse and the color frame phase of the video signal on the video tape.

According to one aspect of the invention, an editing control system comprises a video tape player loaded with a video tape having recorded video information including time code signals and a color subcarrier signal which has a regular phase variation cycle which returns to an initial phase after a given number of frames recorded thereon, a video tape recorder loaded thereon with a video tape with video information recorded thereon including time code signals and a color subcarrier which has a phase variation cycle corresponding to that recorded on the playback video tape, means for detecting the phase of a first color subcarrier in the video information recorded on the playback video tape relative to the time code signals reproduced from the video tape player, means for detecting the phase of a second color subcarrier in the video information recorded on the recording video tape relative to the time code signals reproduced from the video tape recorder, means for setting first and second editing points on the playback and recording video tapes, and means for deriving the first and second subcarrier phases based on the time code signals reproduced at the first and second editing points, comparing the derived first and second subcarrier phases at the first and second editing points, and shifting one of the first or second editing points so that the first and second subcarrier phases at the first and second editing points match.

In a practical embodiment, the editing control system further comprises means for producing a reference synchronizing signal based on which a reference color frame phase signal can be derived, and the video tape player and video tape recorder periodically reproduce first and second color framing pulses at given timings relative to the picture frames on the playback and recording video tapes, which first and second color framing pulses are locked with the reference synchronizing signal at timings independent of each other. The video tape player is responsive to locking of the first color framing pulse with the reference synchronizing signal to output a first locked condition indicative signal, and the recording video tape recorder is responsive to locking of the second color framing pulse with the reference synchronizing signal to output a second locked condition indicative signal. The means for detecting the first color subcarrier's phase and the means for detecting the second color subcarrier's phase are responsive to the first and second locking condition indicative signals for deriving the first and second color subcarrier phases relative to the first and second time code signals.

In the preferred apparatus for detecting the phase of the color subcarrier on the basis of the time code signal, the means for detecting the first color subcarrier's phase is responsive to the first locked condition indicative signal for detecting the first phase difference of the first color framing pulses relative to the reference color frame phase at the timing of the first time code signal, and detects the second phase difference between the first color framing pulse and a first color frame phase representative of the first subcarrier phase in the video information recorded on the video tape player, and thereby detects the relationship of the color frame phase to the first time code signal based on the first and second phase differences. Similarly, the means for detecting the second color subcarrier phase is responsive to the second locked condition indicative signal for detecting first phase difference of the second color framing pulses relative to the reference color frame phase at the timing of the second time code signal, and detects the second phase difference between the second color framing pulse and a second color frame phase representative of the second subcarrier phase in the video information recorded on the video tape recorder, and thereby detects the relationship of color frame phase to the second time code signal based on the first and second phase differences.

In practical operation, the video tape player and video tape recorder are driven in a test mode operation in advance of the editing operation, and the means for detecting a first color subcarrier phase and the means for detecting a second color subcarrier phase are active during the test mode operation for detecting the first and second color frame phases relative to the first and second time code signals.

According to another aspect of the invention, an electronic editing control system comprises a video tape player loaded with a playback video tape having recorded video information including a first color framing pulse, a first time code signal and a first color subcarrier which has a phase variation cycle which returns to an initial phase after a given number of frames, a video tape recorder having loaded thereon a recording video tape on which is recorded video information including a second color framing pulse, a second time code signals and a second color subcarrier which has a phase variation cycle corresponding to that recorded on the playback video tape, and a microprocessor-based editing control apparatus including first means for operating the video tape player and video tape recorder in a test mode, second means, active during the test mode operation, for detecting the phase of the first color subcarrier in the video information recorded on the playback video tape, relative to the time code signals reproduced from the video tape player, third means, also active during the test mode operation, for detecting the phase of the second color subcarrier in the video information recorded on the recording video tape, relative to the time code signals reproduced from the video tape recorder; fourth means, manually operable, for setting first and second editing points on the playback and recording video tapes, and fifth means, active during an edit mode operation, for deriving the first and second subcarrier phases based on the time code signals reproduced at the first and second editing points, comparing the derived first and second subcarrier phases at the first and second editing points, and shifting one of the first and second editing points so that the first and second subcarrier phases at the first and second editing points match.

The electronic editing control system further comprises means for producing a reference synchronizing signal based on which the reference color frame phase can be derived, the video tape player and video tape recorder can detect locking of first and second color framing pulses with the reference synchronizing signal at timings independent of each other to produce first and second locked condition indicative signals. The second and third means are responsive to the first and second locked condition indicative signals for deriving the first and second color subcarrier phases relative to the first and second time code signals. The second means is responsive to the first locked condition indicative signal for mathematically deriving a first value indicative of the first phase difference between the first color framing pulses and the reference color frame phase at the timing of the first time code signal, and a second value representative of second phase difference between the first color framing pulse and a first color frame phase representative of the first subcarrier phase in the video information recorded on the video tape player, and thereby deriving a third value indicative of a third phase difference between the first color frame phase and the first time code signal based on the first and second values.

The third means is responsive to the second locked condition indicative signal for mathematically deriving a fourth value indicative of a fourth phase difference between the second color framing pulses and the reference color frame phase at the timing of the second time code signal, and a fifth value representive of fifth phase difference between the second color framing pulse and a second color frame phase representative of the second subcarrier phase in the video information recorded on the video tape recorder, and deriving a sixth value indicative of a sixth phase difference between the second color frame phase relative to the second time code signal based on the fourth and fifth values. The fifth means of the editing control apparatus derives the first and second subcarrier phases at the first and second edit points based on the first and second time code signals at the first and second edit points and the third and sixth values.

According to a further aspect of the invention an edit control system according to the invention comprises video tape player loaded with a playback video tape on which is recorded color video information which is to be reproduced along with control signals containing periodically superimposed color framing data and a color subcarrier signal which has a phase variation cycle to that returns to an initial phase after a given number of recorded frames, a video tape recorder loaded thereon with a video tape on which is recorded video information to be reproduced with control signals containing periodically superimposed color framing data and a color subcarrier signal which has a phase variation cycle corresponding to that recorded on the playback video tape recorded thereon, means for detecting the phase of the first color subcarrier signal in the video information recorded on the playback video tape relative to the time code signals reproduced from the playback video tape player, means for detecting the phase of a second color subcarrier signal in the video information recorded on the recording video tape relative to the time code signals reproduced from the video tape recorder, and means for setting first and second editing points on the playback and recording video tapes, means for deriving the phases of the first and second subcarrier signals based on the color framing data at the first and second editing points, comparing the derived first and second subcarrier phases at the first and second editing points, and shifting one of the first or second editing points so that the first and second subcarrier signal phases at the first and second editing points match.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
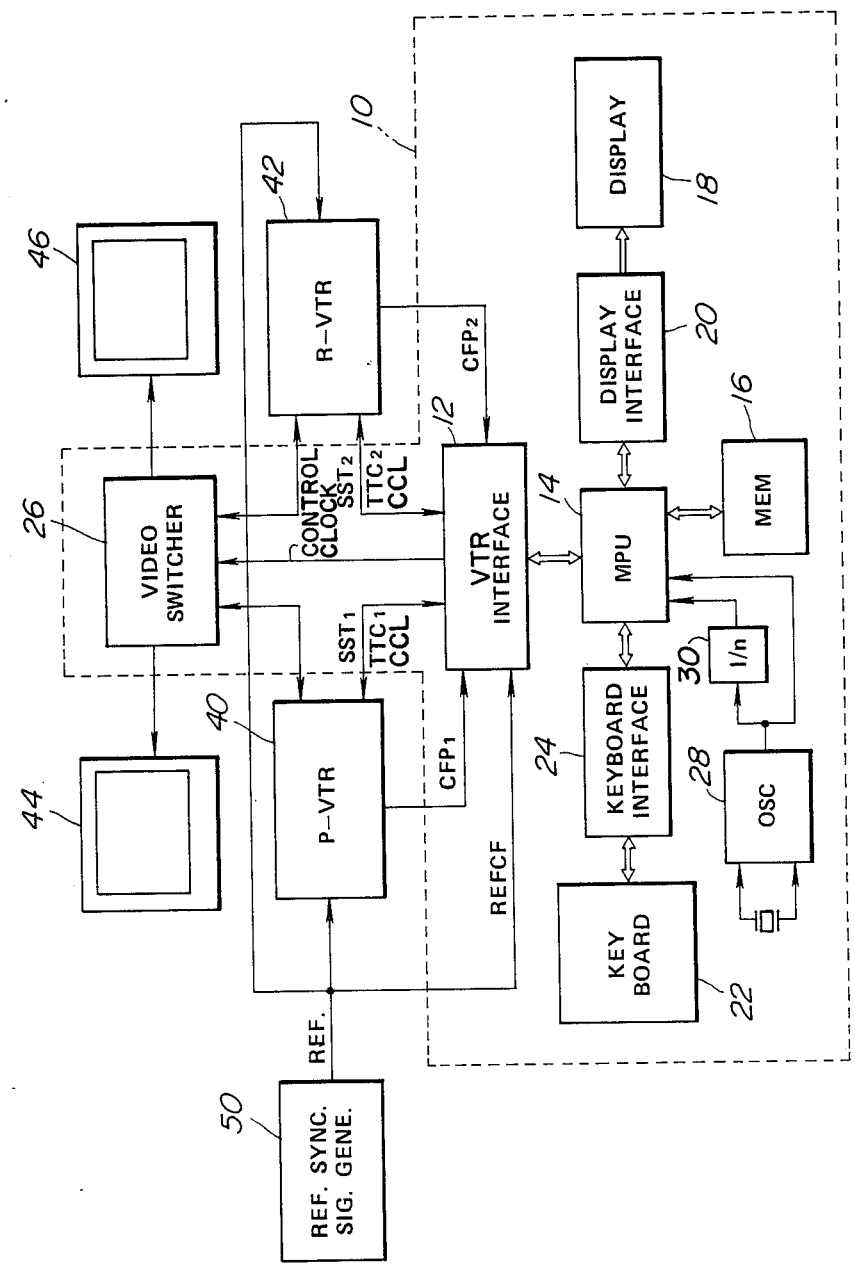
FIG. 1 is a schematic block diagram of an editing control system according to the invention.

Referring now to the drawings, particularly to FIG. 1, the preferred embodiment of an editing system, according to the invention, for video tape recorders includes an electronic editing control apparatus 10. The editing control apparatus 10 is connected to a play-back side video tape recorder (P-VTR) 40, i.e. a VTR operated as a video tape player, and a reproducing-side video tape recorder (R-VTR) 42. The P-VTR 40 and the R-VTR 42 are driven in synchronism with a reference synchronizing signal REF which is generated by a reference synchronization signal generator 50.

The VTRs 40 and 42 are connected through a VTR interface 12 to a microprocessor unit (MPU) 14 of the editing control apparatus 10. The editing control apparatus also includes a memory 16 which includes a register, a counter, etc., (not shown) necessary for editing and performing the editing program. Accordingly, the memory 16 includes, although not shown, a read-only memory (ROM) containing the editing program, and a random-access memory (RAM) required for performing the program. A numeric display 18 is connected through a display interface 20 to the MPU 14. Furthermore, a key board 22 is connected through a key board interface 24 to the MPU 14.

The VTR interface 12 is designed to output operation commands to the VTRs 40 and 42, and receive from them operation status signals $SST_1$ and $SST_2$. The VTR interface 12 also receives control pulse signals CTL reproduced by the VTRs 40 and 42. The VTRs 40 and 42 are connected to a video switcher 26 which is, in turn, connected to monitors 44 and 46.

Control signals are supplied to the video switcher 26 from the VTR interface 12. The editing control apparatus 10 includes an oscillator 28 which includes a crystal oscillator. The oscillator 28 generates clock signals and supplies them to the video switcher 26. The clock signals of the oscillator 14 are also supplied to a frequency divider 30. The frequency divider 30 is designed to generate interrupting clock signals based on the input clock signals to supply to the MPU 14.

The VTR interface 12, the MPU 14, the memory 16, the display 18, the display interface 20, the key board 22, the key board interface 24, the video switcher 26, the oscillator 28 and the frequency divider 30 constitute the editing control apparatus 10. In practice, the components constituting the editing control apparatus 10 are contained in a single cabinet.

When a color framing edit is performed by the preferred embodiment of the editing system; the R-VTR 42 and the P-VTR 40 are provisionally driven in synchronism with the reference synchronizing signal REF prior to the color framing editing operation. During this initial driving, color framing pulses $CFP_1$ and $CFP_2$ are respectively reproduced from the R-VTR 42 and the P-VTR 40. The color framing pulses $CFP_1$ and $CFP_2$ are supplied to the VTR interface 12 of the edit control apparatus 10. The reference synchronizing signal REF is also supplied from the reference synchronizing signal generator 50 to the editing control apparatus 10. The editing control apparatus 10 derives a reference color frame phase signal REFCF based on the reference synchronizing signal REF. The edit control apparatus 10 compares the derived reference color frame phase REFCF with phases of the color frame pulse signals $CFP_1$ and $CFP_2$ in order to derive the respective phase differences. Based on the derived respective phase differences, the color frame servo control of the video signals reproduced by the VTRs 40 and 42 are adjusted in order to match the color frame pulses of the video signals to each other.

For example, the editor 10 may adjust the phase of the video signal reproduced by the P-VTR 40 in order to match the color frame phase thereof with that of the video signal reproduced by the R-VTR 42. After this adjustment, the video signal recorded on the video tape loaded on the P-VTR 40 is recorded on a master tape loaded on the R-VTR 42 by a color framing edit operation.

Practical color frame editing operations to be performed by the preferred embodiment of the editing system according to the invention will be described herebelow with reference to FIGS. 2, 3 and 4. As will be seen from FIG. 4, the process shown is directed to color framing editing operations for a PAL system television signals.

Figure 2:
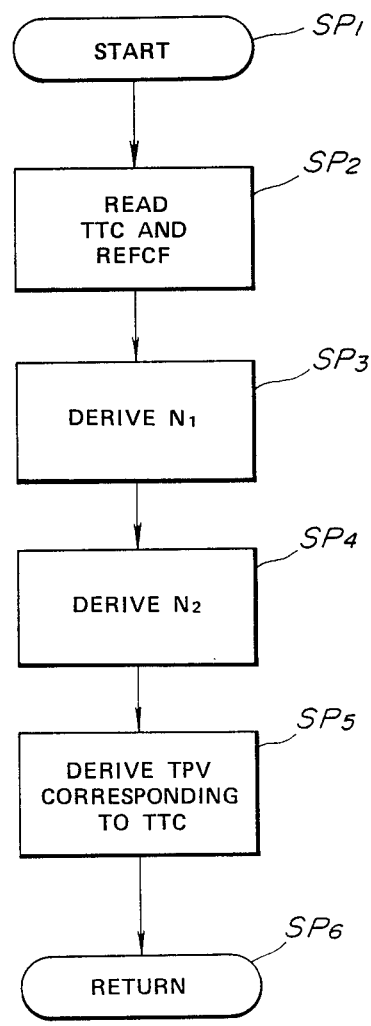
FIG. 2 is a flowchart showing a color frame phase detecting program to be executed by a microprocessor incorporated in the preferred embodiment of the edit control system of FIG. 1.
Figure 3:
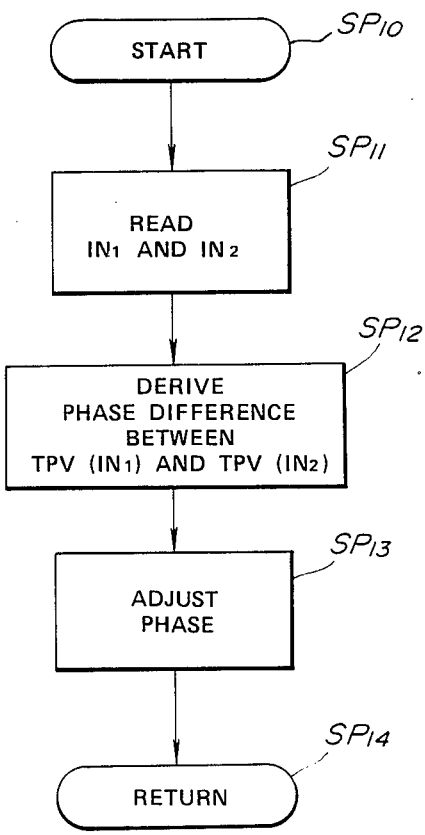
FIG. 3 is a flowchart showing a edit control program to be executed by a microprocessor incorporated in the preferred embodiment of the edit control system of FIG. 1.
Figure 4:
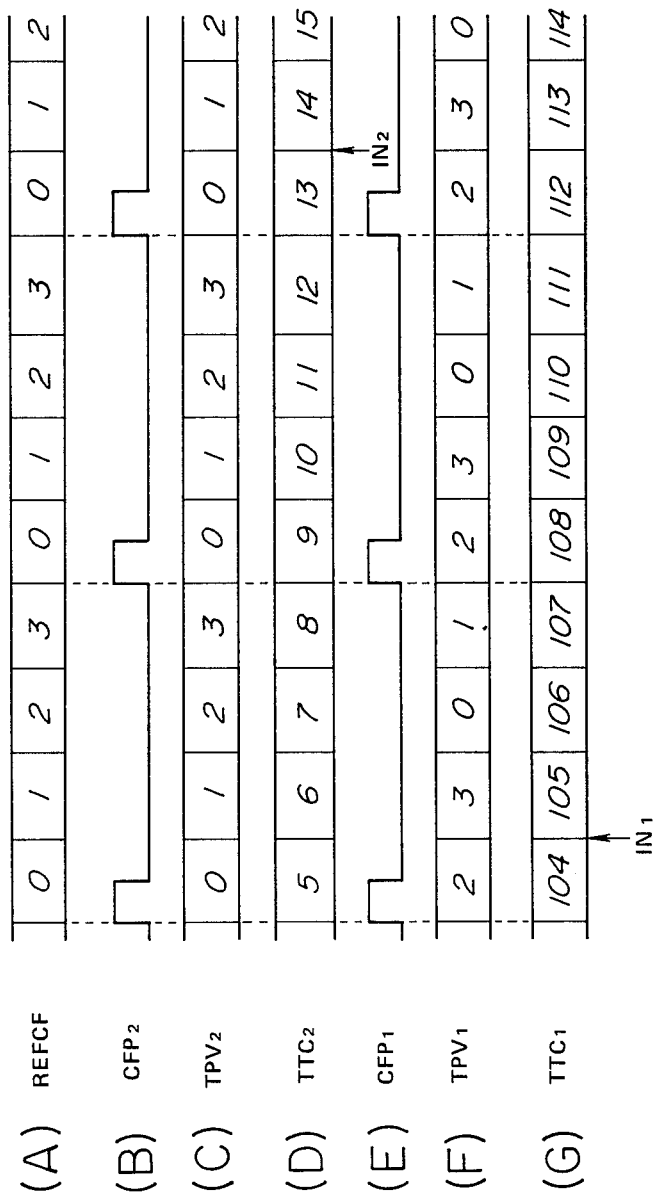
FIG. 4 (A-G) is a timing chart showing relationship of the of the signals produced during edit control operation.

In order to perform color frame editing, the edit control apparatus 10 performs operations according to the process illustrated in FIGS. 2 and 3. FIG. 2 shows a process for deriving the respective relationships of the color frame phases of the video signals reproduced by the P-VTR 40 and R-VTR 42 based upon the corresponding time code signal. This process is performed during a test mode operation. For this, the memory 16 in the edit control apparatus 10 stores a color frame phase detecting program of FIG. 2. The shown program is executed with respect to each of the P-VTR 40 and R-VTR 42 during the test mode operation.

The color frame phase detecting program is generally triggered in response to locking of the color frame pulses $CFP_1$ and $CFP_2$ to the reference color frame phase signal REFCF. Therefore, in advance of starting execution of the color frame phase detecting program, the respective P-VTR 40 and R-VTR are driven in a test run mode. During the test run mode operation, both the P-VTR 40 and R-VTR 42 receive the reference synchronization signal REF from the reference synchronization signal generator 50.

Based on the received reference synchronization signal REF, a reference color frame phase REFCF is derived.

As shown in U.S. Pat. No. 4,052,733, a color frame phase is determined by the phase relation of the color subcarrier to the horizontal sync signal. If one field of the color video signal having a particular phase relation is determined as the first field of the color video signal, the color video signal having the same phase relation again appears at the 9th field thereof, in the case of a PAL signal, for example. That is the sequence of the color frame phase. Incidentally, in the example of FIG. 4, it is assumed that a reference color frame pulse RCFP (not shown), which is to be compared with the color frame pulses $CFP_1$ and $CFP_2$, appears at every frame number "0" in the color frame phase sequence. The problem is that the color frame pulse is not always generated at every "0" frame number in each VTR. For example, the color frame pulse $CFP_1$ is generated at each frame number 2 in the P-VTR 40, while the pulse $CFP_2$, as well as the reference pulse RCFP, is generated at each frame number 0 in the R-VTR 42. Because the color phase of the reproduced video signal which is recorded subsequent to the prerecorded video signal in the R-VTR 42 is not continuous with the color phase of the prerecorded video signal at the editing point, even if the status signals $STT_1$ and $STT_2$ indicate that the color frame pulses $CFP_1$ and $CFP_2$ are in the locked conditions, there may be no continuity in color phases. Though it has not been clearly illustrated, each of the P-VTR 40 and R-VTR 42 compares the color frame pulses with the reference color frame phase REFCF to produce an error signal to be fed to a tape drive servo system. The tape drive servo system controls the tape driving speed to reduce this error signal to zero, at which time the color frame pulses $CFP_1$ and $CFP_2$ lock with the reference color frame phase.

When the color frame pulses $CFP_1$ and $CFP_2$ lock with the reference color frame phase REFCF, the P-VTR 40 and R-VTR 42 produce status signals $STT_1$ and $STT_2$, respectively, indicating that the color frame pulse signals $CFP_1$ and $CFP_2$ are in a locked condition. The status signals $STT_1$ and $SST_2$ are input to the editing control apparatus 10 to trigger the latter. In response to this, the editing control apparatus 10 starts execution of the color frame phase detecting program shown in FIG. 2 to detect the relationship of the color frame phases of the video signals reproduced by respective P-VTR 40 and R-VTR 42.

It should be noted that the detection of the color frame phase relative to the reference color frame phase is performed with respect to each of the video signals reproduced by the P-VTR 40 and the R-VTR 42, independently of the other. Since the process of detecting the color frame phase relative to the reference color frame phase to be performed with respect to the video signal reproduce by the R-VTR 42 is identical to that with respect to the video signal reproduced by the P-VTR 40, the following discussion is given only for the color frame phase detection for the video signal reproduced by the P-VTR 40.

As set forth above, the color frame phase detecting program for detecting the color frame phase of the video signal reproduced by the P-VTR 40 during the test mode operation, is triggered in response to the status signal $STT_1$ from the P-VTR 40. After starting execution of the color frame phase detecting program at a step $SP_1$ in response to the status signal $STT_1$, the time code signal $TTC_1$ reproduced by the P-VTR 40 is obtained at a step $SP_2$. At the same time, the reference color frame phase REFCF is derived based on the reference synchronization signal REF is read. Subsequently, at a step $SP_3$, a pulse relationship between the time code signal $TTC_1$ and the reference color frame phase REFCF is detected.

For example, assume the time code data of the time code signal $TTC_1$ as shown in FIG. 4(G) and the reference color frame phase REFCF as shown in FIG. 4(A) are obtained at the step $SP_2$.

There is existing a first relationship in that the remainder which is obtained by dividing the time code data of the time code signal $TTC_1$ by 4, is coincident with the sequence of the reference color frame phase REFCF. Generally speaking, the first relationship is given by examining whether the reference color frame phase sequence REFCF matches with the sequence of the remainders which is obtained by dividing by 4 the time code data to which one of the integral numbers 0, 1, 2, or 3 is added. In other words, the first relationship is determined by detecting what is the added integral number when the sequence of the remainders is equal to the reference color frame phase sequence.

Thereafter, at a step $SP_4$ the editing control apparatus 10 derives a phase difference DIF between the color frame pulse $CFP_1$ as shown in FIG. 4(E) and a color frame phase $TPV_1$ of the video signal on the tape, which color frame phase $TPV_1$ is illustrated in FIG. 4(F). At a step $SP_5$, the color frame phase $TPV_1$ of the P-VTR 40 is determined from the time code signal $TTC_1$ by using the derived phase difference indicative value DIF. This is because it is impossible to directly detect the color frame phase at the editor 10, since only the time code signal $TTC_1$, and the color frame pulse $CFP_1$ are supplied to the editor 10. The determined relationship between the time code signal $TTC_1$ and the color frame phase $TPV_1$ is regarded as a second relationship to be derived at the step $SP_5$. Thereafter, the process returns to a main routine at a step $SP_6$.

Since the color frame pulse $CFP_1$ is locked with the reference color frame pulse RCFP (which is derived from the reference color frame phase REFCF), the correlation of the time code signal $TTC_1$ with the reference color frame phase REFCF will be obtained by examining the first relationship of the time code signal $TTC_1$, as described above. Furthermore, it is noted that the correlation of the color frame phase $TPV_1$ to the time code signal $TTC_1$ will be obtained from the phase difference DIF by examining the second relationship.

Based on the relationship between the time code signal $TTC_1$ and the color frame phase $TPV_1$ of the video signal on the tape, a color framing edit is performed according to the process illustrated in FIG. 3. In practice, the color framing edit operation can take place in various modes, e.g. assemble mode and insert mode. For example, in the assemble mode, a picture is connected from an edit start point in the record servo condition. On the other hand, in the insert mode, a new picture is inserted into a previously recorded tape in the playback servo condition. Such edit modes are selected through the key board 22. After selecting one of the edit modes, the P-VTR 40 is driven in the playback search mode to perform a picture search for locating the edit start point. This picture search operation for locating the edit start point is also controlled manually by means of the key board 22. Namely, by the manual operation of the key board, a search mode command is supplied from the MPU 14 to the P-VTR 40 via the VTR interface 12. The MPU 14 further supplies a change-over signal to the video switcher 26 via the VTR interface 12 to supply the reproduced video signal from the P-VTR 40 to the monitor 44. Accordingly, the picture from the video tape of the P-VTR 40 is presented on the monitor 44, while the video tape of the P-VTR 40 is driven in the forward and backward direction according to the search command.

During the aforementioned picture search operation, the recorded CTL control pulses are reproduced from the tape by a CTL head. The CTL pulses are supplied to the memory 16 via the VTR interface 12 and the MPU 14. The CTL pulses are counted by a CTL counter (not shown) arranged in the memory 16 under the control of the MPU 14. Then, the output of the CTL counter is supplied to a display register (not shown). The display register counts the CTL signals to produce an hour, minutes, second, frame indicative signal. This signal is supplied to the display 18 via the display interface 20 to display the information.

When the edit start point is found, an IN button (not shown) on the key board is depressed to set an IN point. Data with respect to the IN point is stored in the memory 16. According to the aforementioned process, the IN points of the tape on the P-VTR 40 and the tape on the R-VTR 42 are set.

After setting the IN points, the edit control program of FIG. 3 is executed from a step $SP_{10}$. Immediately after "START" at the step $SP_{10}$, IN point data are read out from the memory 16 at a step $SP_{11}$. Also at the step $SP_{11}$, the time code signals $TTC_1$ and $TTC_2$ at respectively, corresponding, to the IN points are read. The time code signals at the IN points will be referred to as "$IN_1$" and "$IN_2$". At a step $SP_{12}$, the color frame phase sequences $TPV_1$ and $TPV_2$ of video signals on the tapes of the P-VTR 40 and R-VTR 42 are determined in the manner set forth above. Namely, during execution of the color frame phase detecting program of FIG. 2, the color frame phase sequences $TPV_1$ and $TPV_2$ relative to the time code signal $TTC_1$ and $TTC_2$ are determined. Therefore, the color frame phases at the IN points can be determined on the basis of the time code signals $IN_1$ and $IN_2$ at the IN points.

At a step $SP_{13}$, the color frame phase sequences $TPV_1$ and $TPV_2$ for the IN points as derived at the step $SP_{12}$ are compared to each other for judging whether the continuity of a color subcarrier signal can be maintained when the picture reproduced by the P-VTR 40 at the IN point is connected to the picture reproduced by the R-VTR at the IN point. When the continuity of the color subcarrier can be obtained, which happens when the color frame phase sequences $TPV_1$ and $TPV_2$ match, the video signal reproduces by the P-VTR 40 is transferred to the R-VTR 42 for recording. On the other hand, when the color frame phase sequences $TPV_1$ and $TPV_2$ are different from each other, and thus continuity can be distroyed by connecting the picture of the P-VTR 40 to the picture of the R-VTR 42 at the IN points, the edit control apparatus 10 produces a control command for adjusting the color frame phase of one of the video signals on the tapes of the P-VTR 40 and the R-VTR 42. In practice, the control command is supplied to the P-VTR to shift the IN point to the picture having the color frame phase sequence $TPV_1$ matching with that of the video signal on the tape of the R-VTR. After adjusting the color frame phase of the video signal of the tape on the P-VTR 40 to match with that of the R-VTR 42, the edit operation is started. After starting the edit operation, the edit control program of FIG. 3 goes END at a step $SP_{14}$.

It should be appreciated that, though the foregoing discussion has been concentrated on the color frame phase adjustment at the IN points, a similar process can be applied for adjusting the OUT point where edit operation ends. In a practical operation, the OUT points may be set at the picture search for locating the IN points.

A practical edit control operation by utilizing the preferred embodiment of the edit control apparatus as set forth above will be disclosed in terms of a master tape on the R-VTR 42 having the color frame pulse $CFP_2$, the color frame phase sequence $TPV_2$ and the time code signal $TTC_2$ as illustrated in FIGS. 4(B) to 4(D), and an original tape on the P-VTR 40 having the color frame pulse $CFP_1$, the color frame phase sequence TPV$_2$ and the time code signal TTC$_1$ as illustrated in FIGS. 4(E) to 4(G).

As set forth, in advance of the edit operation, the P-VTR 40 and R-VTR 42 are driven in test mode. During test mode operation, the color frame pulses CFP$_1$ and CFP$_2$ are respectively locked with the reference color frame phase REFCF. Assuming the color frame pulse CFP$_2$ of the video signal reproduced by the R-VTR 42 locks with the reference color frame phase REFCF, the status signal STT$_2$ is input to the edit control apparatus 10. Then, the edit control apparatus 10 becomes active to start the execution of the color frame phase detecting program of FIG. 2.

At the steps SP$_2$ and SP$_3$, the editor 10 examines the first relationship between the time code signal TTC$_2$ and the reference color frame phase REFCF. In case of the R-VTR 42, the first relationship indicates that the sequence of the reference color frame phase will coincide with the sequence of the remainders which is obtained by dividing by 4 the time code signal TTC$_1$ to which the number "3" is added.

Since the reference color frame phase signal REFCF corresponds with the color frame phase TPV$_2$ of the video signal, the information of the phase difference DIF received in the step SP$_4$ is "0". Therefore, the editor 10 memorizes the second relationship, i.e. that after adding "3" to the time code signal TTC$_2$, the remainder when the added time code signal TTC$_2$ is divided by "4" corresponds with the color frame phase TPV$_2$ of the video signal.

In the same way, when the color frame pulse signal CFP$_1$ is locked to the reference color frame phase signal REFCF and the status signal STT$_1$ is given from the P-VTR 40 to the editor 10 (step SP$_1$), the editor 10 memorizes as the first relationship that after adding "2" to the time code signal TTC1 in the reproducing P-VTR 40, the remainder when the added time code signal TTC$_1$ is divided by "4" coincides with the color frame phase TPV$_1$ (step SP$_2$–SP$_4$).

Next, an operator designates the frames for editing points IN$_1$, IN$_2$ by means of the keyboard input unit, for example the frame "14" of the time code signal TTC$_2$ for the R-VTR 42 and the frame "105" of the time code signal TTC$_1$ for the P-VTR 40. The editor 10 calculates and judges (step SP$_{12}$) that the color frame phase TPV$_2$ of the video signal at the position corresponding to the time code signal TTC$_2$ become "1" based on the second relationship, and that the color frame phase TPV$_1$ at the position corresponding to the time code signal TTC$_1$ "105" become "3". However, if the video signal of the P-VTR 40 is connected with the video signal of R-VTR 42 as it is, the sequence of the color frame phase on the master tape is not continuous. Therefore, the color frame phase in video signal recording at the editing point in the reproducing VTR$_1$ becomes "1" (step SP$_{13}$).

Thus, according to the above mentioned embodiment, color framing edit can be performed without transmitting the color framing pulses between the VTRs 40 and 42 and the editor 4 through a specifically provided data lines or signal lines. This reduces the number of required cables to be arranged between the VTRs and the edit control apparatus. Therefore, by neglecting the cables for transferring the color framing pulses only for color framing edit, the system can be compact enough and simplified in construction. In addition, the time code signals and the status signals are normally reproduced by the VTRs as a apart of the video signals and transferred to the edit control apparatus with the video tape for functions other than color framing edit. Therefore, it is not required to add circuits for transmitting and receiving the time code signals and the status signal.

It should be appreciated that, though the reference color frame phase varies in each frame, it is locked to the color framing pulses, from which the fields can be known. Therefore, the phase can be controlled in each field on basis of the time code signal which varies with each frame.

The above-mentioned embodiment shows an electronic editing system having the P-VTR and the R-VTR, to which this invention is applied. However, this invention is not limited to this embodiment, and is applicable to the system having a plurality of sets of reproducing VTRs and switchers.

As described above, this invention can perform color frame editing operations without transmitting or receiving the color frame pulses from VTRs to the editor, therefore an electronic editing system employing the invention can be made smaller and simpler since the transmitting and receiving portion can be omitted.

While the present invention has been disclosed in terms of the preferred embodiment in order to facilitate a better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. An edit control system comprising:

A video tape player loaded with a playback video tape having recorded information including time code signals, color frame pulses, and a color subcarrier signal which has a phase variation cycle which returns to an initial phase after a given number of frames;

a video tape recorder loaded with a recording video tape having recorded thereon video information including time code signals, color frame pulses, and a color subcarrier signal which has the same number of phases as the color subcarrier signal recorded on said playback video tape;

control means for causing the video tape player and video tape recorder to move the playback and recording tapes to selected first and second editing points on said playback and recording video tapes, respectively, and reproduce the time code signals and color frame pulses recorded at said selected editing points, respectively;

means supplied with the reproduced time code signals and color frame pulses from the video tape player for deriving therefrom a first color subcarrier signal phase in said video information recorded on said playback video tape;

means supplied with the reproduced time code signals and color frame pulses from the video tape recorder for deriving therefrom a second color subcarrier signal phase in said video information recorded on said recording video tape; and wherein said control means is connected to said means for deriving said first and second subcarrier signal phases so that when said first and second subcarrier signal phases are derived based on said time code signals and color frame pulses reproduced at said first and second editing points, and control means compares the derived first and second subcarrier signal phases at said first and second editing points, and causes one of the video tape player or the video tape recorder to shift one of said first and second editing points, respectively, so that said first and second subcarrier signal phases at said first and second editing points match.

2. An edit control system as set forth in claim 1, wherein the control means causes the video tape player and video tape recorder to reproduce the recorded information on the playback tape and the recording tape, respectively, during a test mode and further comprising means for producing a reference synchronizing signal based on which a reference color frame phase can be derived, and said video tape player and said video tape recorder during the test mode reproduce first and second color framing pulses, respectively, at given timings relative to picture frames on said playback and recording video tapes, which first and second color framing pulses are locked with said reference synchronizing signal at timings independent of each other.

3. An edit control system as set forth in claim 2, wherein said video tape player is responsive to the locking of said first color framing pulse with said reference synchronizing signal to output a first locking condition indicative signal, and said video tape recorder is responsive to locking of said second color framing pulse with said reference synchronizing signal to output a second locking condition indicative signal, and said means for deriving the first color subcarrier signal phase and said means for deriving the second color subcarrier signal phase are responsive to said first and second locking condition indicative signals, respectively, for deriving said first and second color subcarrier signal phases based on, respectively, said first and second time code signals and said first and second color framing pulses.

4. An edit control system as set forth in claim 3, wherein said means for deriving said first color subcarrier signal phase is responsive to said first locking condition indicative signal and derives a first relationship between one of said first time code signals and said reference color frame phase, detects a phase difference between said first color framing pulses and a first color frame phase representative of said first subcarrier signal phase in said video information recorded on said playback tape, and derives a second relationship between said first color frame phase and said one of said first time code signals.

5. An edit control system as set forth in claim 3, wherein said means for deriving said second color subcarrier signal phase is responsive to said second locking condition indicative signal and derives a first relationship between one of said second time code signals and said reference color frame phase, detects a phase difference between said second color framing pulses and a second color frame phase representative of said second subcarrier signal phase in said video information recorded on said video tape recorder, and derives a second relationship between said second color frame phase and said one of said second time code signals.

6. An edit control system as set forth in claim 4, wherein said means for deriving said second color subcarrier signal phase is responsive to said second locking condition indicative signal and derives a first relationship between one of said second time code signals and said reference color frame phase, detects a phase difference between said second color framing pulses and a second color frame phase representative of said second subcarrier signal phase in said video information recorded on said video tape recorder, and derives a second relationship between said second color frame phase and said one of said second time code signals.

7. An edit control system as set forth in claim 4, wherein the number of phases of the color subcarrier signals recorded on each of the playback and recording tapes is a predetermined, integral number N, the time code signals are sequences of integral numbers and said first and second relationships are derived by:
   a. determining an integral number M, which can be added to the first time code signals so that a remainder left over when the sum of the first time code signal number and M is divided by N equals the number of the reference color frame phase;
   b. deriving a phase difference (DIF) between the first color frame pulses and the first color frame phase; and
   c. deriving the first color frame phase from the first time code pulse using the phase difference (DIF).

8. An edit control system as set forth in claim 6, wherein the number of phases of the color subcarrier signals recorded on each of the playback and recording tapes is a predetermined, integral number N, the time code signals are sequences of integral numbers and said first and second relationships are derived by:
   a. determining an integral number M, which can be added to the second time code signals so that a remainder left over when the sum of the second time code signal number and M is divided by N equals the number of the reference color frame phase;
   b. deriving a phase difference (DIF) between the second color frame pulses and the second color frame phase; and
   c. deriving the second color frame phase from the second time code pulse using the phase difference (DIF).

9. An edit control method for controlling a video tape player loaded with a playback video tape having recorded information including first time code signals, first color frame pulses, and a first color subcarrier signal which has a phase variation cycle which returns to an initial phase after a given number of frames and a video tape recorder loaded with a recording video tape having recorded thereon video information including second time code signals, second color frame pulses, and a second color subcarrier signal which has the same number of phases as the color subcarrier signal recorded on said playback video tape, wherein the edit control method comprises the steps of:
   selectively causing the video tape player and video tape recorder to reproduce the respective first and second time code signals and first and second color frame pulses recorded on the playback tape and the recording tape, respectively, during a test mode and thereafter causing the video tape player and video tape recorder to move the playback and recording tapes to selected first and second editing points on said playback and recording video tapes, respectively, and reproducing the respective first and second time code signals and first and second color frame pulses recorded at said selected editing points, respectively;
   from the first time code signals and first color frame pulses reproduced by the video tape player during the test mode, deriving a relationship between the phase of the first color subcarrier signal and the first time code signals and first color frame pulses;

from the second time code signals and second color frame pulses reproduced by the video tape recorder during the test mode, deriving a relationship between the phase of the second color subcarrier signal and the second time code signals and second color frame pulses; and from the first and second time code signals and the first and second color frame pulses reproduced by the video player and video tape recorder at the selected editing points, respectively, deriving said phases of said first and second subcarrier signals based on the previously determined relationships, comparing the derived first and second subcarrier signal phases at said first and second editing points, and causing one of the video tape player or the video tape recorder to shift one of said first and second editing points, respectively, so that said first and second subcarrier signal phases at said first and second editing points match.

10. An edit control method as set forth in claim 9, which further comprises the steps of producing a reference synchronizing signal based on which a reference color frame phase can be derived, and causing said video tape player and said video tape recorder during the test mode to reproduce first and second color framing pulses, respectively, at given timings relative to picture frames on said playback and recording video tapes, which first and second color framing pulses are locked with said reference synchronizing signal at timings independent of each other.

11. An edit control method as set forth in claim 10, wherein said video tape player is responsive to the locking of said first color framing pulse with said reference synchronizing signal to output a first locking condition indicative signal, and said video tape recorder is responsive to locking of said second color framing pulse with said reference synchronizing signal to output a second locking condition indicative signal, and wherein the steps of deriving the first color subcarrier signal phase and the second color subcarrier signal phase are carried out in response to said first and second locking condition indicative signals, respectively.

12. An edit control method as set forth in claim 11, wherein the step of deriving the relationship between said first color subcarrier signal phase and said first time code signals and said first color frame pulses includes the steps of deriving a first relationship between one of said first time code signals and said reference color frame phase, detecting a phase difference between said first color framing pulses and a first color frame phase representative of said first subcarrier signal phase in said video information recorded on said playback tape, and deriving a second relationship between said first color frame phase and one of said first time code signals.

13. An edit control method as set forth in claim 11, wherein the step of deriving the relationship between said second color subcarrier signal phase and said second time code signals and said second color frame pulses includes the steps of deriving a first relationship between one of said second time code signals and said reference color frame phase, detecting a phase difference between said second color framing pulses and a second color frame phase representative of said second subcarrier signal phase in said video information recorded on said playback tape, and deriving a second relationship between said second color frame phase and one of said second time code signals.

14. An edit control method as set forth in claim 12, wherein the step of deriving the relationship between said second color subcarrier signal phase and said second time code signals and said second color frame pulses includes the steps of deriving a first relationship between one of said second time code signals and said reference color frame phase, detecting a phase difference between said second color framing pulses and a second color frame phase representative of said second subcarrier signal phase in said video information recorded on said playback tape, and deriving a second relationship between said second color frame phase and one of said second time code signals.

15. An edit control method as set forth in claim 12, wherein the number of phases of the color subcarrier signals recorded on each of the playback and recording tapes is predetermined, integral number N, the time code signals are sequences of integral numbers and said first and second relationships are derived by:

a. determining an integral number M, which can be added to the first time code signals so that a remainder left over when the sum of the first time code signal number and M is divided by N equals the number of the reference color frame phase;

b. deriving a phase difference (DIF) between the first color frame pulses and the first color frame phase; and c. deriving the first color frame phase from the first time code pulse using the phase difference (DIF).

16. An edit control method as set forth in claim 14, wherein the number of phases of the color subcarrier signals recorded on each of the playback and recording tapes is predetermined, integral number N, the time code signals are sequences of integral numbers and said first and second relationships are derived by:

a. determining an integral number M, which can be added to the second time code signals so that a remainder left over when the sum of the second time code signal number and M is divided by N equal the number of the reference color frame phase;

b. deriving a phase difference (DIF) between the second color frame pulses and the second color frame phase; and c. deriving the second color frame phase from the second time code pulse using the phase difference (DIF).

* * * * *